United States Patent [19]

Peischl et al.

[11] Patent Number: 4,965,810

[45] Date of Patent: Oct. 23, 1990

[54] DIGITAL DIFFERENTIAL PHASE-SHIFT KEYED DECODER

[75] Inventors: Mark L. Peischl, Wayne; Relan N. Vinluan, E. Hanover, both of N.J.

[73] Assignee: Plessey Electronics Systems Corp., Wayne, N.J.

[21] Appl. No.: 272,393

[22] Filed: Nov. 17, 1988

[51] Int. Cl.⁵ .............................................. H03D 3/22
[52] U.S. Cl. ........................................ 375/80; 375/84; 329/304
[58] Field of Search ...................... 375/27, 56, 84, 85, 375/119, 81, 82, 80; 341/76; 329/104, 145, 307, 304

[56] References Cited

U.S. PATENT DOCUMENTS

| | | | |
|---|---|---|---|
| 3,906,380 | 9/1975 | Querry et al. | 329/307 |
| 4,064,361 | 12/1977 | Kustka et al. | 375/119 |
| 4,229,824 | 10/1980 | En | 375/119 |
| 4,379,266 | 4/1983 | Rubin | 375/119 |
| 4,746,872 | 5/1988 | Yamagata et al. | 375/84 |
| 4,769,816 | 9/1988 | Hochstadt et al. | 370/105.3 |
| 4,807,251 | 2/1989 | Shibano | 375/85 |

FOREIGN PATENT DOCUMENTS 58-161555 9/1983 Japan.
61-82552 4/1986 Japan.

OTHER PUBLICATIONS

Digital Analog and Data Communication, pp. 420-421, William Sinnema, Reston Publishing Co., Reston, Va., 1982.
Analog Digital Communications, pp. 160-162, W. David Gregg, John Wiley & Sons, N.Y., Santa Barbard, London, 1977.

Primary Examiner—Benedict V. Safourek
Assistant Examiner—Tesfaldet Bocure
Attorney, Agent, or Firm—David L. Davis

[57] ABSTRACT

Digital circuits increase reliability of a decoder for differential phase-shift keyed signals. A tapped delay line delays the input signal by a variable amount, substantially equal to one bit time of the modulated data, and provides the delayed signal to a multiplier for generating a product signal. In response to changes in frequency of the input signal, a control system selects different taps of the delay line to provide the delayed signal for multiplication by the modulated input signal. The control signal includes a feedback loop, wherein a phase difference between the signal at the selected tap and the input signal is used to change a count in an up/down counter. A tap selecting multiplexer provides an output from specified taps in response to particular values of the count.

13 Claims, 3 Drawing Sheets

DIGITAL DIFFERENTIAL PHASE-SHIFT KEYED DECODER

TECHNICAL FIELD

This invention relates to decoders for differential phase-shift keyed data, and more particularly, to such decoders utilizing digital technology for implementing delay, filtering and compensation functions therein.

BACKGROUND ART

It is known to transmit digital data by providing a differential phase shift to a continuous wave (CW) signal, wherein the phase shift is keyed to the data value. Such data transmission and decoding systems are known as DPSK (differential phase-shift keyed) systems, and include DPSK encoders, transmitters, receivers and decoders for encoding, transmitting, receiving and decoding the data. The present invention is directed to the DPSK decoder, only, independently from the other components of such a system.

In typical prior art systems, such decoders operate using analog techniques. More particularly, the prior art uses analog phase locked loops, multipliers, dividers, phase detectors, filters and comparators to provide a demodulated signal. However, such systems suffer from various deficiencies known in the art, including a requirement for a large number of parts, susceptibility to temperature changes and resultant variation of system characteristics, and general variation of characteristics with aging of the components. Thus, the decoding efficiency and hardware reliability of such prior art systems is adversely affected by use of analog technology therein.

Decoding efficiency and reliability are extremely important in various applications of DPSK systems, however. For example, where DPSK data is used in a microwave landing system to guide an airborne vehicle, the consequences of a system error may be catastrophic. There is accordingly a need in the prior art for a DPSK system having improved decoding efficiency and improved reliability.

Yet another problem encountered with the prior art systems is the difficulty of selecting components to compensate for variations in signal frequency, as well as the above noted effects of temperature and component aging. Accordingly, there is a further need for a DPSK decoder having easily replaceable and controllable components, wherein changes of various parameters may be simply and easily compensated for, whether by replacement of a component or by automatic changes in system operation to provide such compensation.

In typical prior art systems a CW signal is derived from the modulated input signal for comparison with the received signal. In these prior art systems, a squaring loop is used wherein the received, modulated, signal is multiplied by itself, thus providing a double frequency, unmodulated, signal. To use this signal as a reference for comparison with the modulated signal, it is necessary to divide the frequency by two in order to provide a reference having the same frequency as the modulated signal. Comparison of the reference signal and the received (modulated) signal provides an indication of the phase shift therebetween, and thus of the data value used to provide the indicated phase shift.

As above noted, the prior art systems utilize analog components for performing the above functions, and are thus subject at each step of the decoding process to the various difficulties characteristic of analog circuits.

There is accordingly a need for DPSK decoders having an improved feedback control circuit to provide compensation for various errors and parameter changes which occur during operation. There is also a need for providing increased reliability for known DPSK decoders, of the type available in other areas by using digital techniques and digital circuitry.

DISCLOSURE OF THE INVENTION

It is accordingly an object of the present invention to overcome the difficulties of the prior art and to provide an improved DPSK decoder, having an improved reliability and an increased efficiency of decoding.

A more particular object of the invention is to overcome the prior art requirement for a large number of parts, susceptibility to temperature changes and resultant variation of system characteristics, as well as to general variation of component characteristics with aging of the components.

It is a more specific object of the invention to provide an improved feedback control loop in a DPSK decoder, thus to provide compensation for errors and variations in signals and timing caused by changes in circuit parameter values.

Still a more particular object of the invention is to provide a digital DPSK decoder, thus to enhance the reliability thereof.

It is a more detailed object of the invention to provide a DPSK decoder which operates by delaying a modulated input signal by one bit period to provide an output delay signal and which compares the output delay signal with the input signal to provide a decoded output signal representing data modulating the input signal.

Yet another object of the invention is to provide a variable delay line, for introducing a variable delay into the signal received by a DPSK decoder, to compensate for variations in frequency of the received signal caused by ground station tolerances thus to improve the phase relationship between the delayed modulated signal and the received modulated signal.

Still another object of the invention is to provide an up/down counter as a low pass filter in a DPSK decoder.

An additional object of the invention is to provide an up/down counter as a low pass filter of a control loop in a digital DPSK decoder, wherein the counter is responsive to a clock signal and to a signal indicative of the direction of phase shift between the delayed signal and the modulated input signal, and wherein the output of the counter is used to select a delay to be applied to the received signal to obtain a relatively constant phase and constant frequency reference signal therefrom.

In accordance with the invention, there is broadly provided a differential phase-shift keyed decoder, including an input portion for inputting a DPSK modulated input signal and a delay device for delaying the input signal by one bit period of the modulated input signal and for providing an output delay signal. An output portion is provided for comparing the output delay signal with the input signal and for providing a decoded output signal representing data modulating the input signal.

The output portion preferably includes a multiplying circuit for multiplying the modulated input signal by the output delay signal, and for providing an intermediate output signal. The intermediate output signal includes a frequency component oscillating at a frequency corresponding to twice the carrier signal frequency and a data component representative of a phase shift between the modulated input signal and the output delay signal. Also included in the output portion is a filter for filtering out the frequency component from the intermediate output signal to provide a demodulated output signal corresponding only to the data component.

The input portion may include a delay line for delaying the modulated input signal, as well as a compensating circuit for compensating for variations in the received, or carrier, signal frequency. The contemplated compensating circuit includes a control circuit for varying a delay time introduced by the delay line in accordance with a change in frequency of the carrier signal.

In accordance with another aspect of the invention, there is provided an improved differential phase-shift keyed decoder. The improvement includes a compensating circuit for compensating for variations in signal frequency. In turn, the compensating circuit includes a variable delay structure for introducing a variable delay into the received signal.

The variable delay structure preferably includes a tapped delay line having a plurality of output taps providing a plurality of different output tap signals, having different respective delays relative to the received signal. A selecting circuit selects one of the output tap signals as a reference signal for comparison with, and decoding of, the received signal. Moreover, a control circuit is included for controlling the selecting circuit to select a predetermined one of the output taps in accordance with a variation in signal phase.

Preferably, the control circuit includes a comparing section for comparing a selected output tap signal from the plurality of output taps with the received signal, and a signal generating section for generating a control signal responsive to a phase difference between the received signal and the selected output tap signal. The comparing section includes a multiplying circuit for multiplying the selected output tap signal by the received signal, thereby producing a product signal having a double frequency component and a phase error signal component corresponding to the phase difference between the received signal and the selected output tap. The signal generating section includes a filter for removing the double frequency component from the product signal, thereby providing the control signal corresponding to the phase error signal component.

Preferably, the multiplying circuit is operable for causing the phase error signal component of the product signal to have an alternating output with a duty cycle determined by the phase difference. Moreover, the filter includes an up/down counter for counting a clock signal during alternating output portions of the phase error signal component, thereby providing an output control signal corresponding to the phase difference between the selected output tap signal and the received signal. The selecting circuit is connected to be responsive to the counter by selecting predetermined ones of the output taps in response to predetermined counts of the counter.

In accordance with the details of the inventive structure, the selecting circuit includes first and second selecting circuits. The first selecting circuit, as hereinabove described, is operable for selecting a tap of the tapped delay line to provide the reference signal for comparison with, and decoding of, the received signal. The second selecting circuit is operable for selecting a corresponding one of the output taps to provide a tap signal for comparison with the received signal, and for producing an error signal. Moreover, the control circuit is operable for controlling the first and second selecting circuits to select predetermined ones of the output taps in response to predetermined values of the error signal.

A multiplying circuit may be included, for multiplying an output of the second selecting circuit by the received signal to produce the error signal.

More significantly, however, the second selecting circuit includes an in-phase selecting circuit and a quadrature selecting circuit, for selecting a pair of output taps providing output tap signals in quadrature relationship with one another. The system further includes a first multiplying circuit for obtaining a first product of the in-phase and quadrature output tap signals, to provide a first intermediate control signal representative of the received signal substantially as delayed by the delay means.

A second multiplying circuit is included for obtaining a second product of in-phase and quadrature signals obtained at an input portion of the tapped delay line, to provide a second intermediate control signal representative of a substantially current received signal. A third multiplying circuit is used for obtaining a third product of the first and second intermediate control signals, to provide a third intermediate control signal corresponding to the third product. Moreover, the control circuit is responsive to the third intermediate control signal for controlling the in-phase selecting circuit and the quadrature selecting circuit to select output tap signals substantially in phase with the received signal.

The first selecting circuit responds to the control circuit by selecting as the reference signal an output tap signal corresponding to the output tap signals in phase with the received signal. A multiplying circuit is provided, for multiplying the modulated input signal by the reference signal selected by the first selecting circuit and for providing an intermediate output signal. The intermediate output signal includes a frequency component, oscillating at a frequency corresponding to twice the carrier signal frequency, and a data component, representative of a phase difference between the modulated input signal and the reference signal. A filter is included for filtering out the frequency component from the intermediate output signal, thus to provide a demodulated output signal corresponding only to the data component.

The third multiplying circuit is operable for outputting the third intermediate control signal to have frequency components at multiples of the carrier signal frequency, and a phase shift signal component corresponding to the phase shift between the received signal and the output delay signal. The control circuit includes a control signal generating section responsive to the third intermediate control signal and including a further filter for removing the frequency component from the third intermediate control signal, thereby generating the control signal to correspond to the phase shift signal component.

The further filter includes a counter for counting a clock signal during alternating output portions of the phase shift signal component, thereby providing an output control signal corresponding to the phase shift between the selected output tap signal and the received signal.

Similarly, the first mentioned filter may include a counter for counting the clock signal during a modulating phase shift signal component of the intermediate output signal, thereby providing an output signal corresponding to the modulating phase shift applied to the carrier signal by the modulation data.

Other objects, features and advantages of the present invention will become readily apparent to those skilled in the art from the following description wherein there is shown and described a preferred embodiment of the invention, simply by way of illustration and not of limitation of the best mode (and alternative embodiments) for carrying out the invention. The invention itself is set forth in the claims appended hereto. As will be realized upon examination of the specification with due reference to the drawings, the present invention is capable of still other, different, embodiments and its several details are capable of modifications in various obvious aspects, all without departing from the invention which is recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of the present invention and, together with the description, serve to explain the principles of the invention. In the drawings.

DETAILED DESCRIPTION

Figure 1:
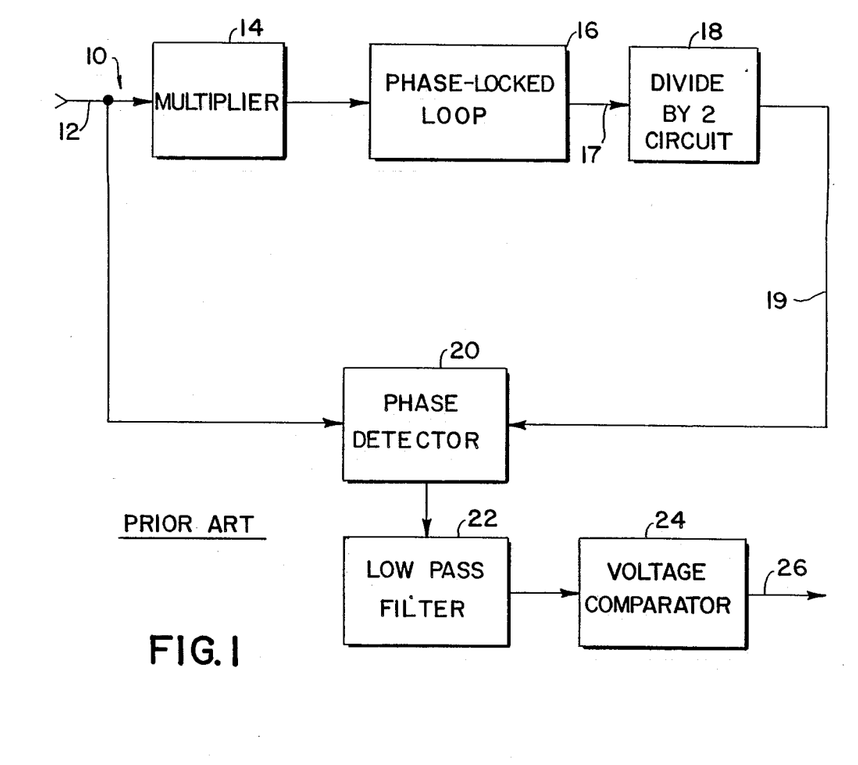
FIG. 1 shows a prior art approach to decoding differential phase-shift keyed data.

Referring now to the illustration of FIG. 1, a prior art approach to decoding differential phase-shift keyed (DPSK) data is represented by the arrangement generally shown at 10. In the analog approach represented thereby, the received modulated signal is provided to the decoder on an input terminal 12. In order to determine the modulating (base-band) data, it is the prior art approach to compare the received signal with a CW reference signal corresponding to the carrier wave originally modulated by the data.

A multiplier 14 receives the modulated signal and multiplies the signal by itself. The multiplier is thus a squaring circuit for the input signal.

The squared signal is a double-frequency signal, at twice the frequency of the carrier wave originally modulated by the data, with the phase modulation removed. A phase-locked loop (PLL) 16 locks to the double-frequency signal, providing a filtered (stabilized) replica thereof on the line 17. Prior to comparison with the received modulated signal, the double-frequency signal is passed through a frequency divider 18, which provides the output reference signal at the carrier frequency on the line 19.

A phase detector 20 receives both the modulated input signal from terminal 12 and the reference signal from frequency divider 18. The output of the phase detector 20 thus represents the modulating data by determining the phase shift between the modulated signal and the CW reference signal. A low pass filter 22 is used to remove any noise from the output of phase detector 20, thus to provide a voltage level more accurately representing the modulating data.

The filtered signal at the output of low pass filter 22 is compared with a reference voltage level by a voltage comparator 24 in order to provide an output signal on an output terminal 26 which represents the modulating data.

If any errors occur in multiplier 14, PLL 16, divider 18, phase detector 20, filter 22 or comparator 24, or if environmental or aging conditions affect operating characteristics of these components, no compensation therefor is provided in the circuit. Thus, an improved closed loop system is needed.

Accordingly, the output signal on terminal 26 may include errors therein resulting from such aging and environmental effects. The reliability of the prior art decoder is accordingly in need of improvement.

Figure 2:
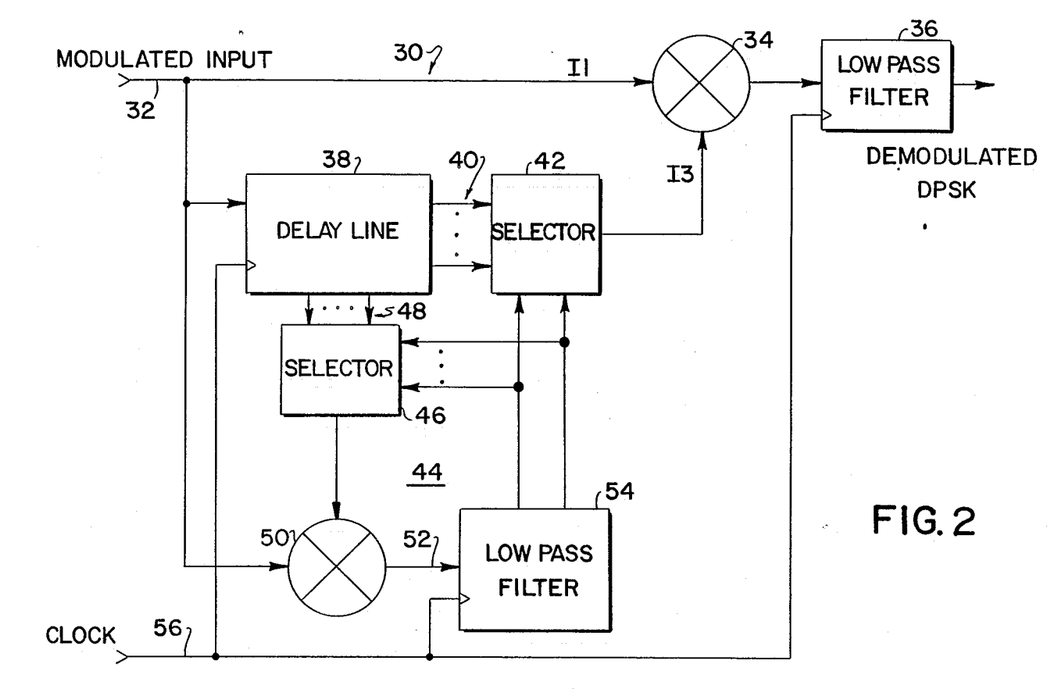
FIG. 2 is a block diagram illustrating the present invention.

Referring now to the embodiment of the present invention shown in FIG. 2, the above disadvantages are overcome by providing a digital decoder, and by including therein an improved digital feedback loop for control and compensation of the decoding process.

One advantage of the inventive embodiment, which will be appreciated from the following disclosure, relates to the elimination of the squaring circuit which was used in the prior art approach simply to create a CW reference signal for the received modulated signal. Any errors in the received signal tend to be magnified by the squaring process. Moreover, the present invention eliminates the need for frequency division, which is another source of error in the prior art approach.

Instead, the present invention provides for a direct comparison of the received signal with the unmultiplied, unsquared, signal received one bit time earlier, avoiding the multiplication and frequency division requirements mentioned above. By providing comparison of the received signal with a time shifted version of itself, and by using digital circuitry throughout, a significant source of error is removed from the decoder circuitry.

Referring specifically to the circuit structure shown in FIG. 2, the inventive decoder circuit is generally shown at 30. Therein, the modulated input signal is received on an input terminal 32. In its basic concept, the present invention provides the input signal directly, as a signal I1, to one input of a digital mixer 34. The other input to the mixer 34 is a delayed version of the same signal, shown as I3, wherein the length of the delay is nominally equal to a bit period of the modulation. The output of digital mixer 34 is itself the desired digital information, the original data.

Advantageously, no further frequency division or phase comparison is required for the data signal. The present invention thus reduces the number of processing steps for the signal and increases the accuracy and reliability of the output.

Instead, the output of digital mixer 34 is simply passed through a low pass filter 36, thus band limiting the signal for further processing. Filter 36 removes from the desired low frequency output signal the high frequency component of the output of digital mixer 34, as well as any high frequency noise which may be present. It is to be emphasized, however, that the inventive structure provides the (unfiltered) digital data directly at the output of digital mixer 34.

From the following description it will be understood that frequency doubling and phase detection functions are performed in the present invention, but that these functions are performed only in the control loop, and not in the main signal path. Thus, the opportunity for error in the output data is reduced and, if error occurs in the frequency doubling or phase detection processes, such error occurs within a compensated feedback loop and results in less harmful effects on the decoded data.

Referring once again to FIG. 2, it is noted that the modulated input signal is also provided to a delay line 38, having a plurality of output taps, generally shown at 40. A selector 42, in the form of a conventional multiplexer, selects the signal on one of output taps 40 to provide input signal I3 to mixer 34, for comparison with the modulated input signal I1.

A feedback control loop 44 is used to control selection of the appropriate output tap of delay line 38 by selector 42, thus to compensate for errors or other variations in input frequency of the modulated signal. Specifically, the feedback control loop is shown generally as including a second selector 46, selecting one of a plurality of additional output taps 48 of delay line 38, together with a second mixer 50.

Mixer 50 receives as its inputs the output of selector 46 and the modulated input signal, and provides an output signal on the line 52 which is proportional to the phase error. The signal on the line 52 is filtered by a low pass filter 54, which provides output signals for control of both selectors 42 and 46, in order to reduce the phase error represented by the signal on the line 52. This arrangement is provided in order to control selector 42 for providing the appropriate signal I3, in phase with signal I1, to mixer 34.

Mixers 34 and 50, which are essentially multipliers, thus provide output signals (substantially DC signals) having a low level if the inputs thereto are in phase and having a high output level if the inputs are out of phase.

It is to be noted that during the start-up period of operation, an acquisition period is established, wherein a CW header is transmitted without modulation. During the acquisition period, which may be 800 micro-seconds in length, for example, the system operates to adjust signal I3 to be in phase with the received signal I1. Since signal I3 is generated by a loop having a long time constant, the signal locks to I1 and remains in phase with I1 during the subsequent acquisition period. I3 thus provides a CW replica of the incoming signal during acquisition.

For the following explanation of operation of the invention, an illustrative example is provided, wherein a 64 micro-second bit period is used in modulating a 750 kHz CW carrier. The period of the carrier is thus 1.33 micro-seconds, so that one bit period is approximately equal to 48 cycles of the carrier. Accordingly, delay line 38 is a 64 micro-second delay line.

In order to provide an acceptable degree of resolution, and to permit phase correction for signal I3 over sufficiently small increments of the incoming signal cycle, a clock signal is used having a frequency 16 times the carrier frequency (i.e., 16 times 750 kHz, or 12 MHZ). By providing 16 taps on the delay line 38, the incoming signal may shift by 22.5° increments to provide signal I3 to mixer 34. The increments may be reduced by increasing resolution with a faster clock signal. In the present embodiment, however, resolution of 1/16th cycle of the carrier frequency is acceptable when compared with the increased hardware cost associated with providing additional output taps from the delay line 38.

The delay line 38 is provided as a sequence of D-type flip-flops. Particularly, 777 flip-flops are connected in a chain wherein the Q output of one flip-flop is connected to the D input of the following flip-flop. Output taps are taken at the Q outputs of the several flip-flops.

The flip-flops in delay line 38, as well as the low pass filter 54, are synchronized by the clock signal, which is provided on an input clock terminal 56. Selector 42, which is a 16-to-1 multiplexer, of a standard TTL type available under the designation 54-150, thus provides any of 16 different phases of the input signal to the digital mixer 34. The phase variation is thus over plus-or-minus one-half cycle of the CW carrier, thus providing a resolution of approximately 0.13 percent of the modulating bit period provided to mixer 34.

In order to compare a previous event (modulation of the carrier signal) with the present event, the delay line 38 is accordingly made to be one-bit period in length. Selectors 42 and 46 provide the signal with a delay of one-bit period, within a small, adjustable, phase difference. The two selectors are substantially identical. However, the output taps which are connected to the two selectors are 90° out of phase with one another, in order to maximize the difference signal therebetween. Of course, a single selector could be used to perform the functions of both selectors 42 and 46. The different functions are better illustrated, however, by showing the selectors as two separate units.

After obtaining the desired fixed phase relationship between signals I1 and I3, for proper decoding the phase of signal I3 must remain constant with respect to the phase of signal I1. By controlling selector 42, low pass filter 54 thus effectively varies the length of delay line 38 to keep the phase of signal I3 equal to the phase of signal I1 even when the frequency of the input signal I1 is changing. It should be noted that frequency variations may occur in the input signal due to tolerances in the ground station frequency, as well as in the airborne avionics.

The structure of delay line 38 effectively samples the input signal at equally spaced intervals, corresponding to the phase resolution of the decoder. The samples are shifted along the delay line 38 for comparison in mixer 34 with the samples of the next bit. As hereinabove described, filter 54 responds to an input signal 52 to select output taps which reduce the phase error represented by signal 52, and, at the same time, maintain the in-phase relationship between the two inputs to mixer 34.

The feedback control loop 44 illustrated in FIG. 2 is a simplified version of the actual loop used in the preferred embodiment. While the system used in FIG. 2 will operate in the manner hereinabove described, reference is made to FIG. 3 for an illustration of the feedback control loop portion of the inventive decoder, and its connection to delay line 38.

Figure 3:
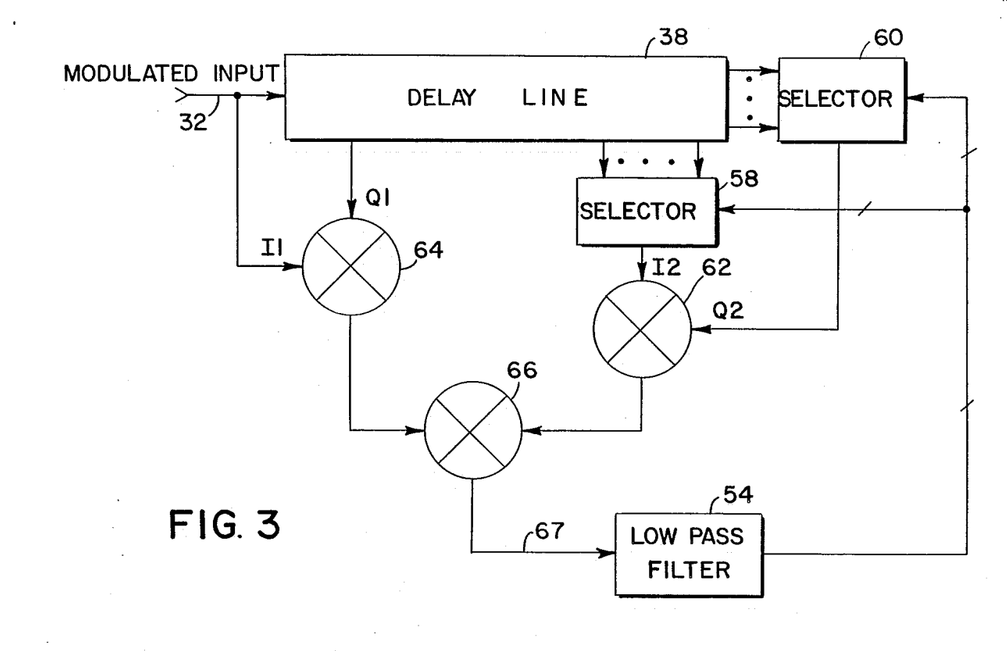
FIG. 3 is a more detailed diagram describing a digital feedback control loop used in the embodiment of FIG. 2.

Referring to FIG. 3, it will first be noted that the second selector 46 is replaced by a pair of selectors 58 and 60, which are connected to in-phase and quadrature connected output taps of delay line 38. Selector 58 thus provides an output I2, in phase with the input signal I1, while selector 60 provides an output signal Q2, 90° out of phase with the input signal I1. The 90° out of phase relationship between the outputs of selectors 58 and 60 is selected in order to maximize the output signal provided by a digital multiplier 62, acting as a mixer therefor.

The output signal from mixer 62, provided as a product of its two input signals I2 and Q2, is thus a signal at double the carrier frequency.

It will be appreciated from a comparison of the structure of FIG. 3 with the feedback control loop 44 of FIG. 2 that the second mixer 50 has been replaced by three mixers, identified in FIG. 3 by reference numerals 62, 64 and 66. Whether the embodiment of FIG. 2 or FIG. 3 is used, the objective of the mixer design is to provide an output signal which is proportional to twice the phase difference between the modulated input signal I1 and I2 (the output of selector 58). In that regard, it is noted that mixer 64 is connected to receive as its two inputs the modulated input signal I1 and a quadrature signal Q1, 90° out of phase therewith. From the illustrative example hereinabove described, wherein sixteen taps cover one full cycle of the carrier frequency, it will be understood that I1 may be considered the output of flip-flop number 0 while Q1 would then be the output of flip-flop number 4, since the output taps of 4 flip-flops cover one-quarter of a cycle of the carrier signal.

The above reference to flip-flop "0" is intended to indicate that the first flip-flop in the chain of flip-flops is not considered part of the delay line but, instead, is the sampler providing the input signal to the delay line. That is, the first flip-flop in the chain, or the 0th flip-flop of delay line 38, is used to sample the signal and synchronize all other samples with the system clock. Accordingly, signal I1 is provided at the output of the 0th flip-flop and the signal Q1 is obtained from a flip-flop four samples removed therefrom. Similarly, the respective inputs to selectors 58 and 60 are also connected to output taps of flip-flops which are separated from one another by four stages, thus providing the 90° phase differential between the inputs of the two selectors.

The delay line 38 itself may be constructed of a connection of a sequence of 54 LS 164-type chips, each of which includes four flip-flop stages. The mixers are preferably standard EXCLUSIVE OR gates, of the type available under chip designation 54 LS 86.

The output of mixer 64 is thus at twice the input frequency. This signal is used as a phase reference input signal to mixer 66. Similarly, the output signal of mixer 62 is at twice the input frequency but is out of phase with the output of mixer 64 by the phase difference between the signals I1 and I2.

Upon multiplying the outputs of mixers 64 and 62 in mixer 66, there is provided an output which is proportional to twice the phase difference of I1 and I2, along with other high frequency components. As will be apparent from the following description, the high frequency components are removed from the output signal by low pass filter 54. Moreover, the filter averages out the desired component of the signal.

The above referenced desired component is found on the incoming DC signal from mixer 66 to filter 54. It is the output of low pass filter 54 which is used to select the particular output taps of delay line 38 to be used to provide the signals I2, Q2 and I3, in such a manner as to reduce the phase difference between I1 and I2.

The phase detector formed by mixers 62, 64 and 66 will be appreciated as one having a characteristic related to twice the phase difference between signals I1 and I2. More particularly, the characteristic is proportional to twice the cosine of the phase difference. Thus, in order to obtain a 0 error signal output from the mixer 66, the cosine of twice the phase difference should be 0. That is, the phase difference should accordingly be ±45°. As a result, signal I3 may lock either in phase or 180° out-of-phase with the input signal I1.

It should also be appreciated that the double angle characteristic of the phase detector makes the phase transitions of 180°, found on the input signal, transparent to the low pass filter 54.

Low pass filter 54 is implemented as an up/down counter, of the type available under designation 54 LS 191. In practice, the counter counts up by the number of occurrences of the clock pulse during a period of the output signal provided by mixer 66. In that regard, it is again noted that mixer 64 multiplies the incoming signal by itself (with a 90° phase shift) to get a double frequency output signal. Mixer 62 performs the same function but at the end of the delay line, i.e., operating on a signal one bit period earlier. Thus, the two signals being provided as inputs into mixer 66 are each at double the carrier frequency, so that the resultant product of the multiplication performed in mixer 66 is at four times the carrier frequency.

Accordingly, mixer 66 provides at its output 67 a signal at four times the carrier frequency whose duty cycle is proportional to the phase error. The phase difference signal on the line 52, provided as an input to filter 54, determines whether the counter forming filter 54 counts up or down, or does not add any counts at all. The output of filter 54 is used to cause the various selectors to select different taps of the delay line 38, thus to change the duty cycle of the signal on the line 52 to filter 54. The filter 54 is thus incremented or decremented by the number of clock pulses occurring during the positive or negative output value of the signal on the line 52.

The following example is provided to illustrate operation of the low pass filter 54. It should first be recognized that the output of mixer 66 has two components. A first component is a pulse sequence occurring at four times the carrier frequency, as has been hereinabove established. A second component is a DC component reflecting the phase error between the input and the output of delay line 38.

The sum of the two signals produces a signal having a duty cycle which depends on the phase error. For zero phase error, the duty cycle will be 50%, so that the change in the count of the counter, reflected in a change in counter output over a cycle, will be zero. That is, the counter part of filter 54 will count up during one half cycle and will count down by the same amount during the second half cycle, for a net change of zero, thus causing no change in the output taps selected by the various selectors.

However, for a positive phase error, the duty cycle of the signal on the line 52 will change in one direction, while for a negative phase error, the duty cycle of the signal will change in the opposite direction. Thus, for a positive change in phase difference, as the duty cycle increases, the output signal from the counter forming low pass filter 54 will increase over a cycle of the signal on the line 52. Due to the increased output signal, the various selectors will operate to select taps having a reduced phase difference with the input signal.

The output signal from the filter 54 will continue to increase in the positive direction until appropriate taps are chosen which reduce the phase error to zero, and a 50% duty cycle is again attained. Similarly, when the error is negative, the count of the counter of filter 54 will decrease, causing selection of output taps successively increasing the phase error until a 50% duty cycle is again attained.

The counter used to form filler 54 is preferably 14 stages long, and is always counting. However, only the four most significant bits of the counter are used to provide the output signals controlling the selectors. Thus, the minor indications of phase change caused by the count during any given half cycle of the signal on the line 52 are ignored and the phase errors are, effectively, averaged out until the change in count reaches the minimum threshold of 1024 clock pulses before the selectors change the output taps.

It should be noted that similar considerations are applicable to low pass filter 36. However, in the preferred embodiment, low pass filter 36 is preferably a standard RC type filter.

Where greater resolution is desired, a higher clock frequency would be used, together with an increased number of stages in delay line 38. The number of significant bits of the counter used to form the control signals for the selectors could also be increased, thus reducing the time over which the phase changes are being averaged.

Although the preceding example referred to increased duty cycle and increased output count of the filter in response to increased phase difference, as well as to control of the selectors to select taps of lower phase difference responsive thereto, it will be appreciated by those skilled in the art that any of the above may be changed or reversed by simple logic design techniques without changing the thrust of the invention.

Moreover, for proper operation of the invention, the variable length delay is essential although the specific delay, about which the variation occurs, may change. Similarly, for digital circuits, operating with pulsed signals, the quadrature mode of operation hereinabove described is essential. However, although a digital feedback technique for achieving a phase lock is disclosed, it will be appreciated that a similar technique could also be achieved with analog circuitry. Alternatively, the above described decoder may be achieved using software, or any combination of analog hardware, digital hardware, or software. Any of the digital circuitry may be realized using discrete components, integrated circuit chips, or VLSI (very-large-scale-integration) technology.

Moreover, if the input frequency could be fixed, the delay line 38, mixer 34 and low pass filter 36 would implement the invention without need for the feedback control loop. However, because of frequency variations in the incoming signal, the control loop 44 of FIG. 2, and the detailed circuitry of FIG. 3, are added.

There has accordingly been disclosed a method and apparatus of DPSK decoding, utilizing a novel carrier-derived coherent detection technique. The resultant decoder structure advantageously exhibits wide acquisition and track ranges. In such an arrangement, the different bandwidths which are typically required in PLL technology for acquisition and tracking, are not required. Moreover, phase resolution is selectable, thus permitting reliable decoding at signal-to-noise ratios approaching the theoretical limit for DPSK.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

We claim:

1. In a differential phase-shift keyed decoder which receives a differential phase-shift keyed signal at a carrier frequency, delays the received signal by nominally one bit time, and compares the received signal with the one bit delayed received signal to provide a decoded output data signal, the improvement comprising compensating means for compensating the delay time to account for variations in the carrier frequency, the compensating means including:

tapped delay means having said received signal as an input and having a plurality of output taps providing a plurality of different output tap signals, respectively having different delays relative to said received signal;

selecting means for selecting one of said output tap signals from said plurality of output taps as a reference signal to be used for comparison with and decoding of said received signal; and control means for controlling said selecting means to select a predetermined one of said output taps in accordance with a variation in carrier frequency, said control means including means coupled to said delay means for providing a comparison signal related to said reference signal by a fixed phase relationship, and means utilizing said comparison signal to control said selecting means, said control means being in a feedback loop between an output of the selecting means and a control input of the selecting means.

2. An improved differential phase-shift keyed decoder as recited in claim 1 wherein said control means comprises:

comparing means for comparing a selected output tap signal from said plurality of output taps with said received signal, and signal generating means for generating a control signal responsive to a phase difference between said received signal and said selected output tap signal.

3. An improved differential phase-shift keyed decoder as recited in claim 2 wherein said comparing means comprises multiplying means for multiplying the selected output tap signal by said received signal, thereby producing a product signal having a double frequency component and a phase error signal component corresponding to said phase difference, and said signal generating means comprises filter means for removing said double frequency component from said product signal thereby providing said control signal corresponding to said phase error signal component.

4. An improved differential phase-shift keyed decoder as recited in claim 3 wherein said multiplying means is operable for causing said phase error signal component of said product signal to have an alternating output with a duty cycle determined by said phase difference, and said filter means comprises counting means for counting a clock signal during alternating output portions of said phase error signal component thereby providing an output control signal corresponding to said phase difference between the selected output tap signal and the received signal.

5. An improved differential phase-shift keyed decoder as recited in claim 1 wherein said selecting means is connected to be responsive to said counting means by selecting predetermined ones of said output taps in response to predetermined counts of said counting means.

6. An improved differential phase-shift keyed decoder as recited in claim 1 wherein said selecting means comprises first and second selecting means,
said first selecting means being operable for selecting a tap of said delay means to provide said reference signal for comparison with and decoding of said received signal;
said second selecting means being operable for selecting a corresponding one of said output taps to provide said comparison signal for comparison with said received signal and for producing an error signal;
said control means being operable for controlling said first and second selecting means to select predetermined ones of said output taps in response to predetermined values of said error signal.

7. An improved differential phase-shift keyed decoder as recited in claim 6 further comprising multiplying means for multiplying an output of said second selecting means by said received signal to produce said error signal.

8. An improved differential phase-shift keyed decoder as recited in claim 6 wherein said second selecting means comprises in phase selecting means and quadrature selecting means for selecting a pair of output taps providing output tap signals having a quadrature relationship with one another,
further comprising:
first multiplying means for obtaining a first product of said in phase and quadrature output tap signals to provide a first intermediate control signal corresponding to said first product and representative of the received signal substantially as delayed by said delay means,
second multiplying means for obtaining a second product of in phase and quadrature signals obtained at an input portion of said delay means to provide a second intermediate control signal corresponding to said second product and representative of a substantially current received signal, and
third multiplying means for obtaining a third product of said first and second intermediate control signals to provide a third intermediate control signal corresponding to said third product,
said control means being responsive to said third intermediate control signal for controlling said in phase selecting means and said quadrature selecting means to select output tap signals substantially in phase with said received signal.

9. An improved differential phase-shift keyed decoder as recited in claim 8 wherein said first selecting means is responsive to said control means by selecting as said reference signal an output tap signal corresponding to said output tap signals in phase with said received signal.

10. An improved differential phase-shift keyed decoder as recited in claim 9 further comprising:
multiplying means for multiplying said modulated input signal by said output tap signal selected by said first selecting means as said reference signal, and for providing an intermediate output signal including a frequency component oscillating at a frequency corresponding to twice the carrier signal frequency and a data component representative of a phase difference between said modulated input signal and said reference signal, and
filter means for filtering out said frequency component from said intermediate output signal to provide a demodulated output signal corresponding only to said data component.

11. An improved differential phase-shift keyed decoder as recited in claim 10 wherein said third multiplying means is operable for providing said third intermediate control signal with frequency components at multiples of said carrier signal frequency and a phase shift signal component corresponding to said phase shift between the received signal and said output delay signal, and said control means comprises control signal generating means responsive to said third intermediate control signal,
said control signal generating means comprising further filter means for removing said frequency component from said third intermediate control signal thereby generating said control signal to correspond to said phase shift signal component,
said further filter means comprising counting means for counting a clock signal during alternating output portions of said phase shift signal component,
thereby providing an output control signal corresponding to said phase shift between the selected output tap signal and the received signal.

12. An improved differential phase-shift keyed decoder as recited in claim 11 wherein said filter means comprises counting means for counting said clock signal during a modulating phase shift signal component of said intermediate output signal,
thereby providing an output signal corresponding to said modulating phase shift applied to said carrier signal by the modulation data.

13. In a differential phase-shift keyed decoder which receives a differential phase-shift keyed signal at a carrier frequency, delays the received signal by nominally one bit time, and compares the received signal with the one bit delayed received signal to provide a decoded output data signal, the improvement comprising compensating means for compensating the delay time to account for variations in the carrier frequency, the compensating means including:
tapped delay means having said received signal as an input and having a first plurality of output taps providing a first plurality of different output tap signals, respectively having different delays relative to said received signal, and a second plurality of output taps each corresponding to a respective one of the first plurality of output taps and providing a second plurality of output tap signals each corresponding to a respective one of the first plurality of output tap signals, wherein there is a fixed phase relationship between respective ones of said first and second pluralities of output tap signals;
first selecting means for selecting one of said first plurality of output tap signals from said first plurality of output taps as a reference signal to be used for comparison with and decoding of said received signal;
second selecting means for selecting one of said second plurality of output tap signals from said second plurality of output taps as a comparison signal; and control means including a feedback loop around said second selecting means, said control means utilizing said comparison signal and said received signal for controlling said first and second selecting means to each select a respective predetermined one of said first and second pluralities of output taps in accordance with a variation in carrier frequency.

* * * * *